(12) United States Patent
Moran

(10) Patent No.: US 6,703,596 B1
(45) Date of Patent: Mar. 9, 2004

(54) APPARATUS AND SYSTEM FOR IMAGING RADIO FREQUENCY ELECTROMAGNETIC SIGNALS

(75) Inventor: Joseph E. Moran, Morgan Hill, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 115 days.

(21) Appl. No.: 09/986,926

(22) Filed: Nov. 13, 2001

(51) Int. Cl.[7] .............................................. H01L 27/00
(52) U.S. Cl. ................................. 250/208.1; 250/203.1
(58) Field of Search ............................. 250/208.1, 216, 250/203.2; 342/179, 176, 200, 66; 343/753, 755

(56) References Cited

U.S. PATENT DOCUMENTS 5,792,055 A * 8/1998 McKinnon .................. 600/410
6,208,288 B1 * 3/2001 Shoucri et al. ............. 342/179
6,252,557 B1   6/2001 Plugge et al.

* cited by examiner

*Primary Examiner*—Que T. Le
(74) *Attorney, Agent, or Firm*—Townsend and Townsend and Crew LLP

(57) ABSTRACT

An apparatus and system for imaging radio frequency electromagnetic signals that is useful for imaging a target object in order to identify an unknown object or to determine the condition or configuration of a known object. One embodiment of an apparatus for imaging radio frequency electromagnetic signals comprises an optical source operable to output an unmodulated optical signal; an image sensor operable to receive the unmodulated optical signal and an incident radio frequency electromagnetic signal and to modulate the unmodulated optical signal with the received radio frequency electromagnetic signal so as to form a modulated optical signal; a lens operable to receive the modulated optical signal and to focus the modulated optical signal; and a photodetector operable to receive the focused modulated optical signal and output an electrical signal representing the focused modulated optical signal. The optical source may be a laser.

44 Claims, 11 Drawing Sheets

APPARATUS AND SYSTEM FOR IMAGING RADIO FREQUENCY ELECTROMAGNETIC SIGNALS

BACKGROUND OF THE INVENTION

1. Field of the Invention

The present invention relates to apparatus for imaging from the reception of radio frequency electromagnetic signals.

2. Related Art

Array antennas for transmission and reception of radio frequency electromagnetic signals are well known in the art. One important use of such antenna arrays is the acquisition of information about a target object. It is well known to acquire information such as range, direction, and altitude of a target object. However, it is also useful to acquire additional information about a target object. An example of such information is information that would enable the target object to be identified. It is well known to use altitude and speed, which can be calculated from repeated range, direction, and angular position measurements, to infer the identity of a target object. However, a target object could be much more efficiently and reliably identified if it could be imaged.

Various techniques exist that can produce such an image, with a given resolution, such as synthetic aperture radar (SAR). The obtained resolution is dependent on various factors, including, but not limited to: antenna aperture size, frequency of operation, and bandwidth. In addition, factors that effect the practicality of implementing such systems include physical size of the antenna aperture, processing of the data generated from such a system and overall cost of implementing such a system. To produce images with increasing detail or image increasingly smaller targets, narrower antenna beamwidths, and/or higher frequencies are typically required. To achieve a narrower beamwidth, the physical antenna aperture size may be increased, which increased the complexity and cost of the system by increasing the number of antenna elements and associated electronics and support structure, or the antenna aperture may be increased synthetically, which increases the data processing requirements and also increases cost.

These increases in cost and complexity can become very significant, especially in spaceborne applications, in which computer processing power and storage is at a premium. For example, data generated from a spaceborne system may be transmitted to a ground station for further processing, in an attempt to avoid increasing cost and complexity of the spacecraft. However, practical link data rates will limit how much data can be transmitted at a given time, thus limiting how much data can be generated and stored before transmission can occur.

One approach to reduce the complexity of such systems makes use of optical components and processing techniques by translating received RF information onto light, via an electro-optic modulator (EOM). These signals are then optically combined for further processing via various lenses, and the resulting signal is projected onto a traditional electronic imaging array. The electronic imaging array, such as a charge coupled device (CCD) produces an image based on the projected signal. The image may be displayed for viewing or digitized for transmission to another location for viewing or processing.

In the prior art, antenna elements were typically connected directly to individual EOMs through transmission lines. In the case of imaging at millimeter wavelengths, the received RF signal may first be down converted using well known RF techniques to bring the signal within the operating range of the EOM and to avoid the high loss of millimeter-wave transmission lines. The down converted signal is then modulated directly onto an optical carrier, for processing, via the EOM. While this approach offers a reduction in the overall complexity of such a system, it still suffers from the performance penalties incurred by connecting discrete components together in terms of size, weight, and RF performance. For example, antenna elements must be connected to discrete EOMs via transmission lines, such as coaxial cables, which have RF loss and may vary in signal phase relative to adjacent elements, further complicating the eventual combination of signals. If the array is to operate at microwave or higher frequencies, the antenna array element spacing tends to restrict the space available for an EOM, as well as the orientation of the EOM behind each element. In the prior art, attempts have been made to directly integrate a traditional antenna element with an EOM in an effort to realize the size and weight advantages offered by the use of fiber optic components. This approach suffered from the fact that traditional antenna structures do not easily lend themselves to integration onto lithium niobate or gallium arsenide substrates, upon which commercially available EOMs are based.

What is needed is an antenna array structure that allows for direct integration of an EOM into its structure, but avoids the size, weight, and performance penalties incurred in present approaches, thereby making such an approach practical for use as an imaging sensor.

SUMMARY OF THE INVENTION

The present invention is an apparatus and system for imaging radio frequency electromagnetic signals. The present invention is useful for imaging a target object in order to identify an unknown object or to determine the condition or configuration of a known object.

In one embodiment, the present invention is an apparatus for imaging radio frequency electromagnetic signals comprising: an optical source operable to output an unmodulated optical signal; an image sensor operable to receive the unmodulated optical signal and an incident radio frequency electromagnetic signal and to modulate the unmodulated optical signal with the received radio frequency electromagnetic signal so as to form a modulated optical signal; a lens operable to receive the modulated optical signal and to focus the modulated optical signal; and a photodetector operable to receive the focused modulated optical signal and output an electrical signal representing the focused modulated optical signal. The optical source may be a laser.

One aspect of the present invention is the image sensor, which comprises: in a plurality of cells, each cell comprising: a first electro-optically active optical waveguide; a first planar electrode substantially parallel to the first waveguide; a second electro-optically active optical waveguide; a second planar electrode substantially parallel to the second waveguide, the first and second planar electrodes being substantially adjacent and coplanar; and a third planar electrode substantially parallel to the first and second planar electrodes and disposed such that the first waveguide lies between the first and third planar electrodes, and the second waveguide lies between the second and third planar electrodes.

The optical source may be coupled to a first end of each of the waveguides. The apparatus may further comprise an output optical waveguide coupled to the second end of each of the first and second waveguides. The apparatus may further comprise a coupler electrically connecting the first and third planar electrodes, whereby the first and third planar electrodes are kept at substantially the same electrical potential. The apparatus may further comprise a polymer layer in which the waveguides are formed and to which the planar electrodes are attached. The first planar electrode may be arranged so that an incident radio frequency electromagnetic signal will impinge upon the first planar electrode.

In one embodiment, the third planar electrode comprises a first portion and a second portion and is disposed such that the first waveguide lies between the first planar electrode and the first portion of the third planar electrode, and the second waveguide lies between the second planar electrode and the second portion of the third planar electrode.

The optical source may be coupled to a first end of each of the waveguides. The apparatus may further comprise an output optical waveguide coupled to the second end of each of the first and second waveguides. The apparatus may further comprise a coupler electrically connecting the first planar electrode and the first and second portions of the third planar electrode, whereby the first planar electrode and the first and second portions of the third planar electrode are kept at substantially the same electrical potential. The apparatus may further comprise a polymer layer in which the waveguides are formed and to which the planar electrodes are attached. The first planar electrode may be arranged so that an incident radio frequency electromagnetic signal will impinge upon the first planar electrode.

The photodetector may be an array of photodiodes.

In another embodiment, the present invention is an apparatus for imaging radio frequency electromagnetic signals comprising: an imaging sensor operable to receive an incident radio frequency signal and output a corresponding electrical signal; and a processor operable to receive the electrical signal and generate a signal representing an image of the received radio frequency signal. The apparatus may further comprise a display operable to display the signal representing an image of the received radio frequency signal.

One aspect of this embodiment is the imaging sensor, which comprises: an optical source operable to output an unmodulated optical signal; an image sensor operable to receive the unmodulated optical signal and an incident radio frequency electromagnetic signal and to modulate the unmodulated optical signal with the received radio frequency electromagnetic signal so as to form a modulated optical signal; a lens operable to receive the modulated optical signal and to focus the modulated optical signal; and a photodetector operable to receive the focused modulated optical signal and output an electrical signal representing the focused modulated optical signal. The optical source may be a laser.

One aspect of the present invention is the image sensor, which comprises: a plurality of cells, each cell comprising: a first electro-optically active optical waveguide; a first planar electrode substantially parallel to the first waveguide; a second electro-optically active optical waveguide; a second planar electrode substantially parallel to the second waveguide, the first and second planar electrodes being substantially adjacent and coplanar, and a third planar electrode substantially parallel to the first and second planar electrodes and disposed such that the first waveguide lies between the first and third planar electrodes, and the second waveguide lies between the second and third planar electrodes.

The optical source may be coupled to a first end of each of the waveguides. The apparatus may further comprise an output optical waveguide coupled to the second end of each of the first and second waveguides. The apparatus may further comprise a coupler electrically connecting the first and third planar electrodes, whereby the first and third planar electrodes are kept at substantially the same electrical potential. The apparatus may further comprise a polymer layer in which the waveguides are formed and to which the planar electrodes are attached. The first planar electrode may be arranged so that an incident radio frequency electromagnetic signal will impinge upon the first planar electrode.

In one embodiment, the third planar electrode comprises a first portion and a second portion and is disposed such that the first waveguide lies between the first planar electrode and the first portion of the third planar electrode, and the second waveguide lies between the second planar electrode and the second portion of the third planar electrode.

The optical source may be coupled to a first end of each of the waveguides. The apparatus may further comprise an output optical waveguide coupled to the second end of each of the first and second waveguides. The apparatus may further comprise a coupler electrically connecting the first planar electrode and the first and second portions of the third planar electrode, whereby the first planar electrode and the first and second portions of the third planar electrode are kept at substantially the same electrical potential. The apparatus may further comprise a polymer layer in which the waveguides are formed and to which the planar electrodes are attached. The first planar electrode may be arranged so that an incident radio frequency electromagnetic signal will impinge upon the first planar electrode.

The photodetector may be an array of photodiodes.

In another embodiment, the present invention comprises a system for imaging a target using imaging radio frequency electromagnetic signals comprising: an illuminator operable to radiate radio frequency electromagnetic signals so as to illuminate the target; and an imaging apparatus operable to receive radio frequency electromagnetic signals reflected from the target and to image the received radio frequency electromagnetic signals.

In one aspect of this embodiment, the illuminator comprises: a radio frequency transmitter operable to output a radio frequency electrical signal; and a transmitting antenna coupled to the radio frequency electrical signal and operable to radiate a radio frequency electromagnetic signal.

In another aspect of this embodiment, the imaging apparatus comprises: an imaging sensor operable to receive an incident radio frequency signal and output a corresponding electrical signal; and a processor operable to receive the electrical signal and generate a signal representing an image of the received radio frequency signal. The apparatus may further comprise a display operable to display the signal representing an image of the received radio frequency signal.

One aspect of this embodiment is the imaging sensor, which comprises: an optical source operable to output an unmodulated optical signal; an image sensor operable to receive the unmodulated optical signal and an incident radio frequency electromagnetic signal and to modulate the unmodulated optical signal with the received radio frequency electromagnetic signal so as to form a modulated optical signal; a lens operable to receive the modulated optical signal and to focus the modulated optical signal; and a photodetector operable to receive the focused modulated optical signal and output an electrical signal representing the focused modulated optical signal. The optical source may be a laser.

One aspect of the present invention is the image sensor, which comprises: a plurality of cells, each cell comprising: a first electro-optically active optical waveguide; a first planar electrode substantially parallel to the first waveguide; a second electro-optically active optical waveguide; a second planar electrode substantially parallel to the second waveguide, the first and second planar electrodes being substantially adjacent and coplanar; and a third planar electrode substantially parallel to the first and second planar electrodes and disposed such that the first waveguide lies between the first and third planar electrodes, and the second waveguide lies between the second and third planar electrodes.

The optical source may be coupled to a first end of each of the waveguides. The apparatus may further comprise an output optical waveguide coupled to the second end of each of the first and second waveguides. The apparatus may further comprise a coupler electrically connecting the first and third planar electrodes, whereby the first and third planar electrodes are kept at substantially the same electrical potential. The apparatus may further comprise a polymer layer in which the waveguides are formed and to which the planar electrodes are attached. The first planar electrode may be arranged so that an incident radio frequency electromagnetic signal will impinge upon the first planar electrode.

In one embodiment, the third planar electrode comprises a first portion and a second portion and is disposed such that the first waveguide lies between the first planar electrode and the first portion of the third planar electrode, and the second waveguide lies between the second planar electrode and the second portion of the third planar electrode.

The optical source may be coupled to a first end of each of the waveguides. The apparatus may further comprise an output optical waveguide coupled to the second end of each of the first and second waveguides. The apparatus may further comprise a coupler electrically connecting the first planar electrode and the first and second portions of the third planar electrode, whereby the first planar electrode and the first and second portions of the third planar electrode are kept at substantially the same electrical potential. The apparatus may further comprise a polymer layer in which the waveguides are formed and to which the planar electrodes are attached. The first planar electrode may be arranged so that an incident radio frequency electromagnetic signal will impinge upon the first planar electrode.

The photodetector may be an array of photodiodes.

BRIEF DESCRIPTION OF THE FIGURES

The present invention will be described with reference to the accompanying drawings.

DETAILED DESCRIPTION OF THE PREFERRED EMBODIMENTS

The present invention is described in terms of the above example. This is for convenience only and is not intended to limit the application of the present invention. In fact, after reading the following description, it will be apparent to one skilled in the relevant art how to implement the present invention in alternative embodiments.

Figure 1:
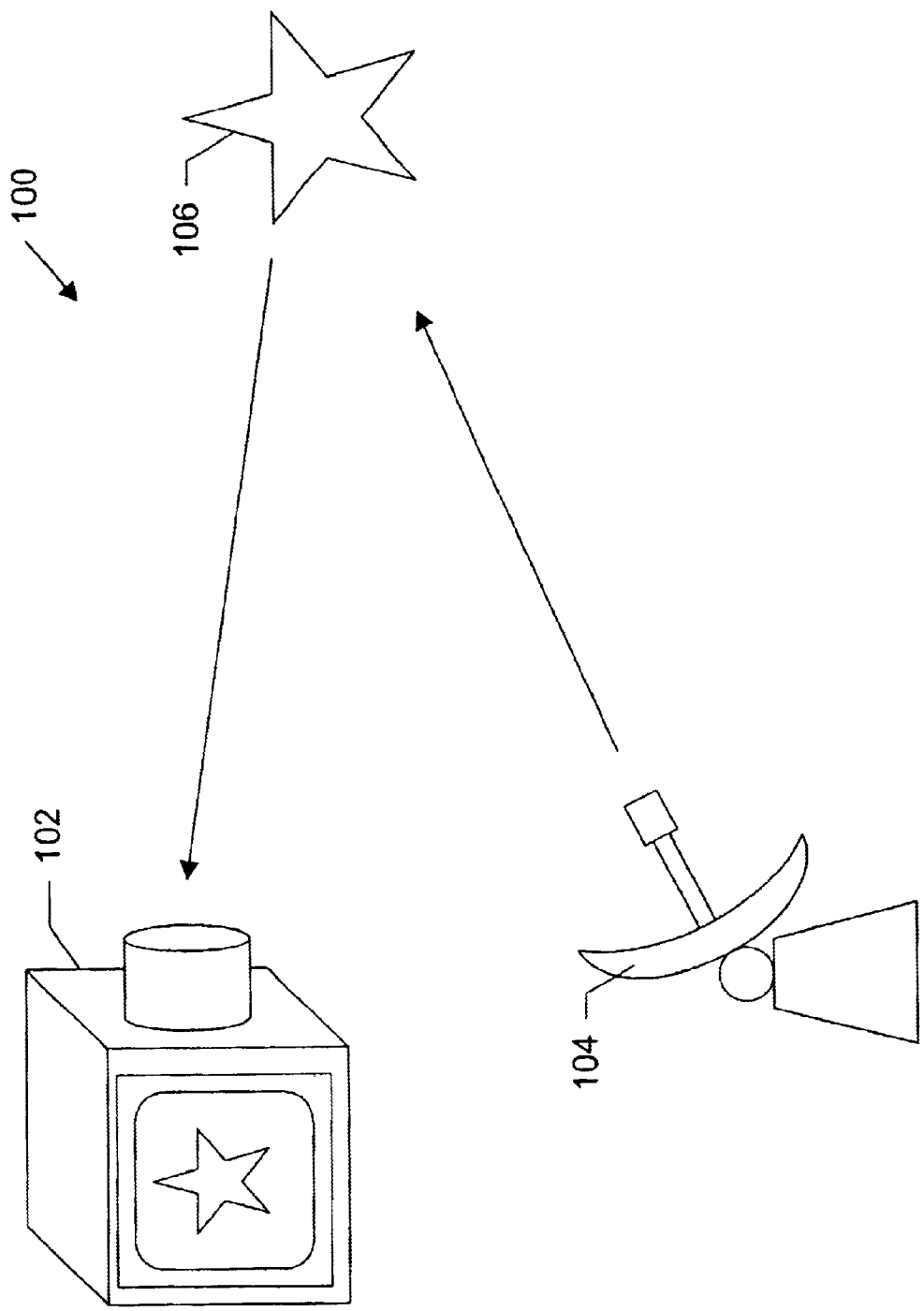
FIG. 1 depicts an exemplary electromagnetic imaging system, according to a preferred embodiment of the present invention.

An exemplary electromagnetic imaging system 100, according to a preferred embodiment of the present invention, is shown in FIG. 1. System 100 includes imaging apparatus 102, electromagnetic illuminator 104, and target object 106. Electromagnetic illuminator 104 radiates radio frequency (RF) electromagnetic radiation that illuminates target object 106. Illuminator 104 typically includes an RF transmitter connected to an appropriate transmitting antenna. A portion of the illuminating RF radiation is reflected off of target 106 towards imaging apparatus 102. Imaging apparatus 102 receives the reflected RF radiation and, by a combination of transducers and processing, displays an image of the received RF radiation reflected from target object 106. Target object 106 may be any object or type of object and may be located anywhere, on the ground, on the water, in the air, or in space.

Figure 2:
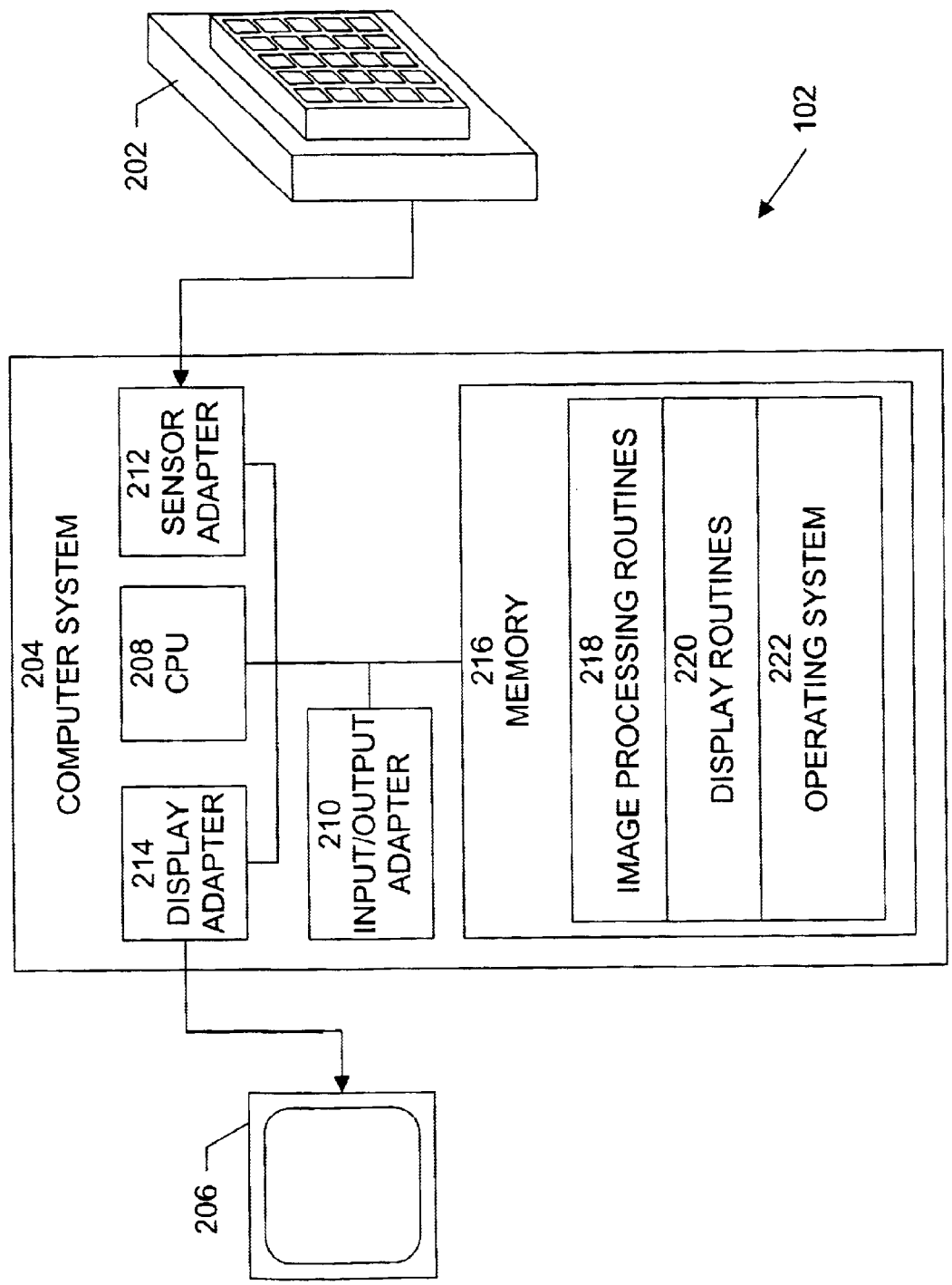
FIG. 2 depicts an imaging apparatus shown in FIG. 1 in greater detail.

Imaging apparatus 102 is shown in greater detail in FIG. 2. Imaging apparatus 102 includes imaging sensor 202, computer system 204, and display 206. Imaging sensor 202 receives incident RF electromagnetic signals and outputs a corresponding electrical signal. Computer system 204 receives the electrical signal, processes it, and outputs a signal representing an image of the received RF electromagnetic signals. Display 206 receives the signal output from computer system 204 and outputs a display representing an image of the received RF electromagnetic signals.

Computer system 204 is typically special purpose computer system, such as a single-board, single-chip, or embedded processor, but may also be a programmed general-purpose computer system, such as a personal computer, workstation, server system, and minicomputer or mainframe computer. Computer system 204 includes central processing unit (CPU) 208, input/output adapter 210, sensor adapter 212, display adapter 214, and memory 216. CPU 208 executes program instructions in order to carry out the functions of the present invention. Typically, CPU 208 is a microprocessor, such as an INTEL PENTIUM® processor or an embedded processor, but may also be a minicomputer or mainframe computer processor. Input/output adapter 210 provides the capability to input data to, or output data from, computer system 204. For example, input/output circuitry may include input devices, such as keyboards, mice, touchpads, trackballs, scanners, etc., output devices, such as video adapters, monitors, printers, etc., and input/output devices, such as, modems, etc. Sensor adapter 212 interfaces computer system 204 with imaging sensor 202. Display adapter 214 interfaces computer system 204 with display 206.

Memory 216 stores program instructions that are executed by, and data that are used and processed by, CPU 208 to perform the functions of the present invention. Memory 216 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 2, memory 216 includes image processing routines 218, display routines 220 and operating system 222. Image processing routines process data relating to the electromagnetic signals received by imaging sensor 202 to form images representing the received electromagnetic signals. Display routines 220 process the images generated by imaging routines 218 for display by display 206. Operating system 222 provides overall system functionality.

Figure 3:
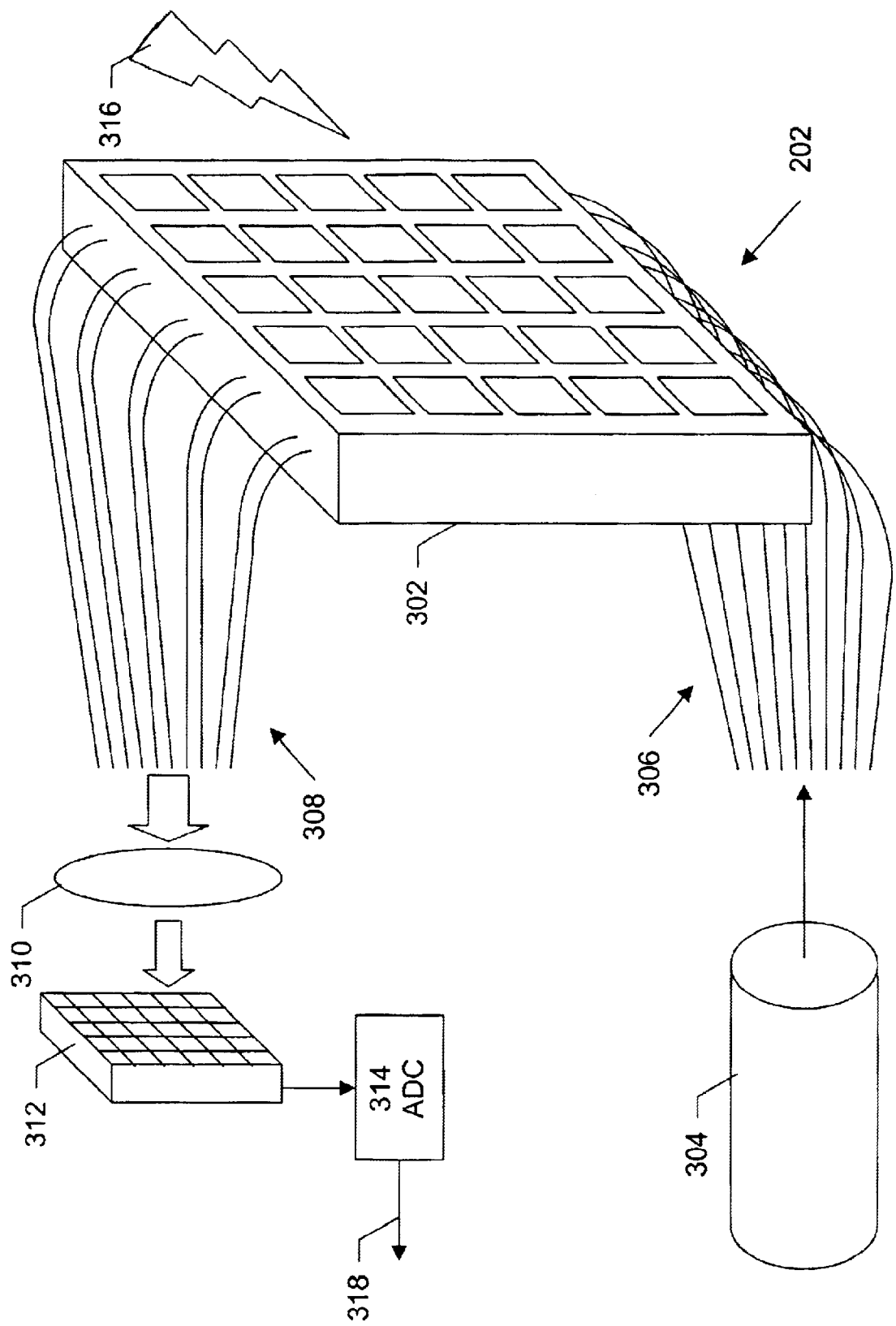
FIG. 3 is an exemplary block diagram of an imaging sensor shown in FIG. 2.

An exemplary block diagram of an imaging sensor 202 is shown in FIG. 3. Imaging sensor 202 includes sampler array 302, laser drive source 304, input optical fibers 306, output optical fibers 308, lens 310, photodetector 312, and analog to digital converter (ADC) 314. Sampler array 302 is an array of antenna elements that receive incident RF electromagnetic radiation 316 and an array of Mach-Zehnder modulators associated with the antenna array, that modulate the RF signals received by the antenna elements onto optical carrier signals. The unmodulated optical carrier signals are provided by laser drive source 304, which outputs an unmodulated coherent optical signal onto input optical fibers 306. Input optical fibers 306 are optical waveguides that carry the unmodulated optical carrier to the Mach-Zehnder modulators in sampler array 302, where the optical carrier is modulated in each modulator according to the electromagnetic signal received by the antenna element corresponding to each modulator. The modulated optical signals are output from sampler array 306 via output optical fibers (waveguides) 308 and fed into lens 310. Lens 310 performs optical processing on the modulated optical signals that is equivalent to a fast-Fourier transform (FFT). Lens 310 also focuses an image of the modulated optical signals onto photodetector 312, which converts the modulated optical signals into analog electrical signals. The analog electrical signals are input to ADC 314, which outputs digital signals representing the analog electrical signals to sensor adapter 212.

Photodetector 312 may be any standard photodetector array, such as an array of reverse biased semiconductor photodiodes, complementary metal oxide semiconductor (CMOS) photodetectors, or any other photodetector that converts optical signals to electrical signals. Although, in FIG. 3, ADC 314 is shown as being included in imaging sensor 202, ADC 314 may instead be included in sensor adapter 212, shown in FIG. 2.

Figure 4:
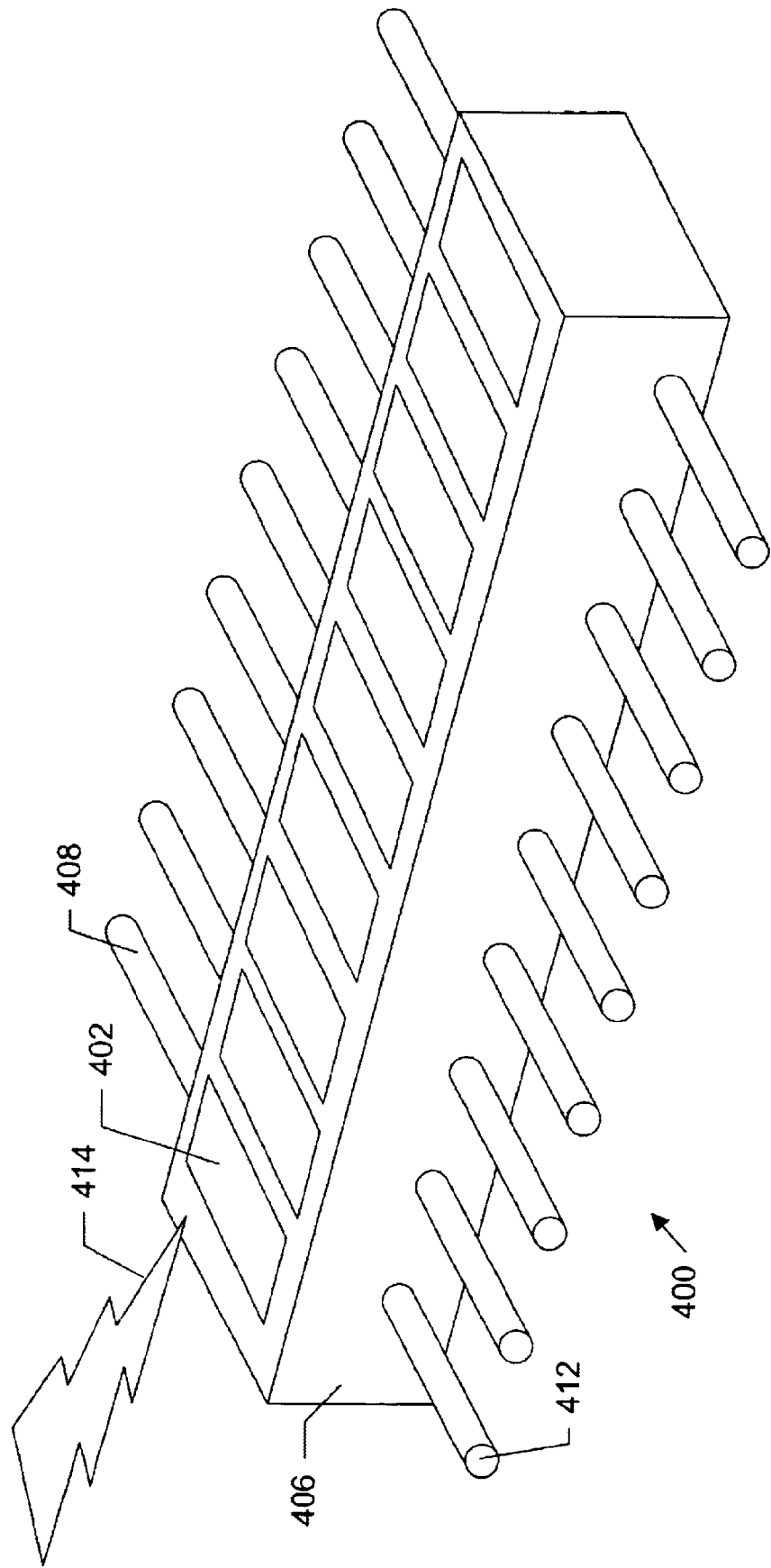
FIG. 4 depicts a sampler array according to a preferred embodiment of the present invention.

As an example, FIG. 4 depicts a portion 400 of sampler array 202 according to a preferred embodiment of the present invention. Sampler array 400 includes a plurality of antenna elements 402, a dielectric support 406, and optical fibers 408, 412. In a preferred embodiment, antenna elements 402 are metallic strips (also referred to as "planar electrodes") printed upon a polymer sheet, although other materials or antenna elements may be used. Sampler array 400 also includes plurality of Mach-Zehnder modulators (not shown); each centered underneath the gap between a pair of adjacent antenna elements 402. A metallic coupling strip (not shown) resides below each Mach-Zehnder modulator, extending underneath each arm of the Mach-Zehnder modulator, and together with a pair of antenna elements 402 forms a pair of capacitors, where each arm of the modulator lies within one of the capacitors. The sampler array 400 may can include more or less elements than depicted in FIG. 4 and may be configured to form a 2-dimensional or planar array.

Each Mach-Zehnder modulator is stimulated by an optical source via an input fiber 408. In a preferred embodiment, the optical source is a laser. An electromagnetic wavefront 414, impinging on the sampler array 400, will generate a field across the sampler array 400 which will in turn set up a voltage across each gap between adjacent antenna elements 402 and between each antenna element 402 and a corresponding coupling strip. This voltage modulates the optical drive signal provided by input fibers 408. Output fibers 412 are fed to a photodiode or the like, where the signal may be recovered according to conventional methods. This condition is repeated across the entire structure 400 and effectively samples the electromagnetic wavefront 414, which can then be reconstructed. By keeping the antenna elements 402 small, the response bandwidth of the sampler array 400 can be made very large.

In a preferred embodiment, one antenna element 402 in each pair of antenna elements is held to the same voltage potential as the corresponding coupling strip. In addition, a DC bias can be applied to the other antenna element in the pair to bias the Mach-Zehnder modulator at its quadrature point or any other point that is desired.

Figure 5:
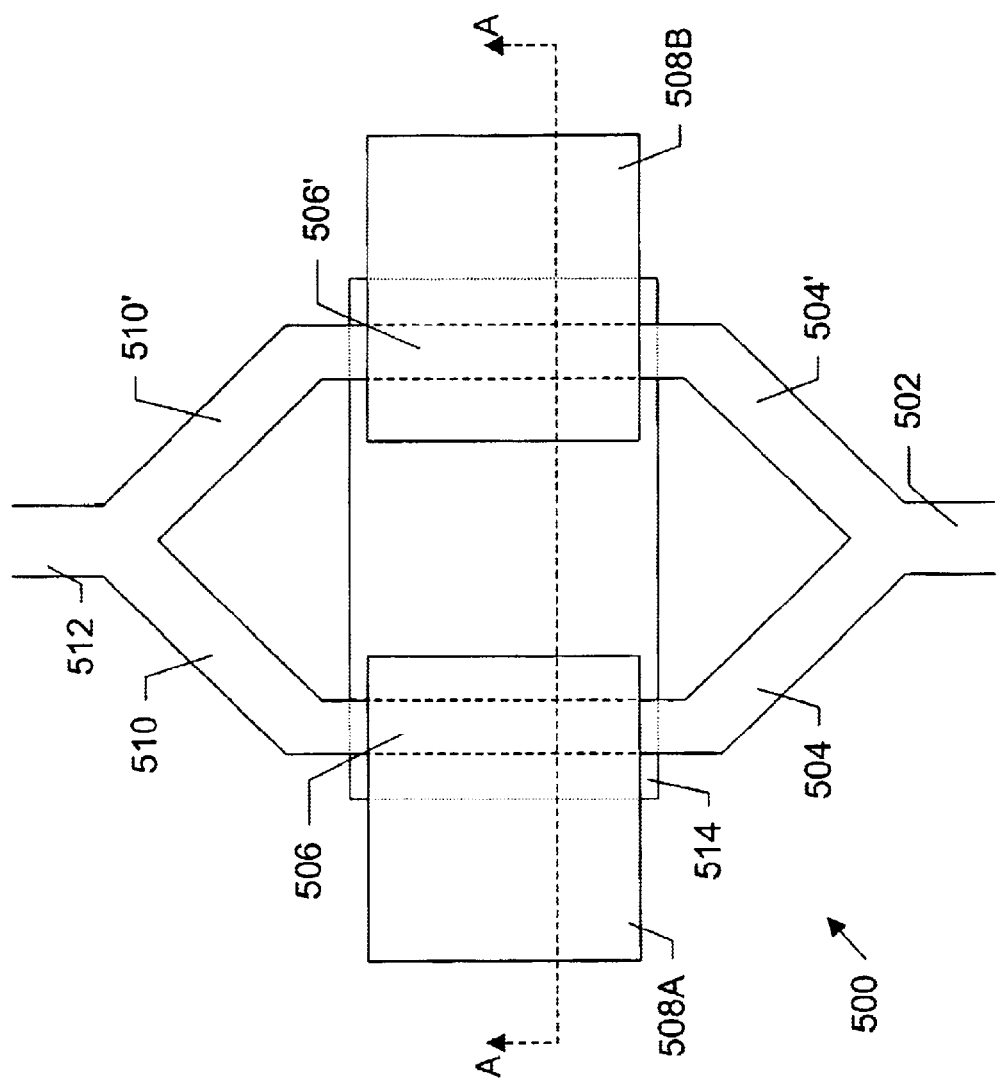
FIG. 5 is a frontal view of a portion of a sampler array corresponding to a single sampler "cell" according to one embodiment of the present invention.

FIG. 5 is a frontal view of a portion of sampler array 400 corresponding to a single sampler "cell" 500 according to one embodiment of the present invention. The sampler cell includes two antenna elements 508A and 508B, a coupling strip 514, and a pair of optical waveguides 506 and 506', which form the "arms" of a Mach-Zehnder modulator. Each arm 506 lies between one of the antenna elements 508 and coupling strip 514, which effectively forms a pair of capacitors, where each arm 506 of the modulator lies between the plates of one of the capacitors. Other coupling configurations or schemes are contemplated. In a preferred embodiment, one antenna element 508 is tied electrically to coupling strip 514 to bring them to the same electrical potential, while the other antenna element has a DC bias applied to it, to bias the modulator at a desired operating point.

The Mach-Zehnder modulator includes an optical input channel 502, which receives the optical drive signal provided by an input fiber 408. The optical input signal is split into two optical paths 504 and 504'. The optical signals pass beneath antenna elements 508A and 508B in optical channels 506 and 506'. Referring to FIG. 5, assume that antenna element 508B is electrically tied to coupling strip 514. The RF field that impinges on antenna elements 508 will then induce a varying voltage potential between the "floating" antenna element 508A and coupling strip 514. That voltage will advance or retard the optical signal in intervening optical path 506, changing its phase relative to "tied" optical path 506'. The optical signals exit the modulator on paths 510 and 510', and are combined, producing a modulated output optical signal 512.

Figure 6:
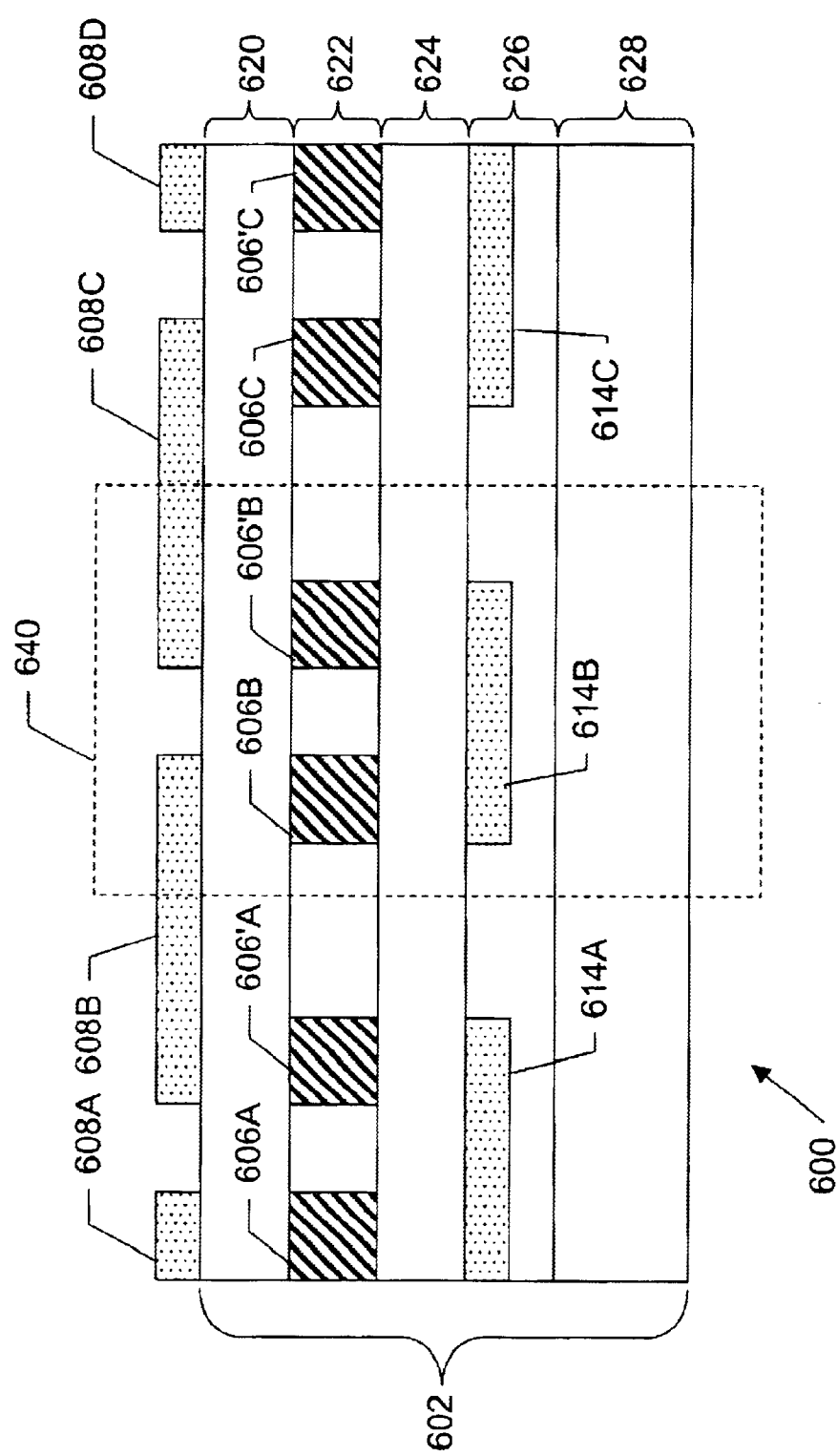
FIG. 6 presents a cross-section of a portion of the sampler array of FIG. 5.

FIG. 6 presents a cross-section of a portion 600 of one embodiment of sampler array 400, which corresponds to section A—A of FIG. 5. Portion 600 includes antenna elements 608A, B, C, D, which are mounted upon body 602. Body 602 includes polymer layers 620, 622, and 624. Each of layers 620, 622 and 624 is approximately 3 micrometers thick, and has a dielectric constant of 3.4 in a preferred embodiment. Within layer 622, optical waveguides are formed and represent the core. Polymer layer 624 adjoins a layer 626 of $SiO_2$ having a thickness of 2.0 micrometers and an epsilon of 3.9 preferably. Layers 620 and 624 effectively become the cladding. Layer 626 adjoins a silicon substrate having a thickness of 10–20 mils, an epsilon of 12, and a rho of 3000 ohm-centimeters. In a preferred embodiment, the electro-optic polymer is a two component material consisting of 15% (by weight) of the chromophore 4-(Dicyanomethylene)-2-methyl-6-(4-dimethylaminostyryl)-4H-pyran (DCM) in the partially-fluorinated polyimide polymer ULTRADEL 4212®, available from BP Amoco Chemicals Inc., Warrensville Heights, Ohio. Although the construction has been described using polymer materials, any suitable electro-optic material may be used to form body 602. Also in a preferred embodiment, antenna elements 608 measure approximately 1 inch on each edge and are separated from each other by a gap measuring between 100 micrometers and 2 mils. Variations on these dimensions may be made to optimize or customize the performance or operation of the present invention.

Layer 622 includes a plurality of optical paths. In particular, the optical paths include paths 606B and 606'B, which form the branches of a single Mach-Zehnder modulator 640. Layer 626 includes a plurality of coupling strips 614. Coupling strip 614B forms a part of Mach-Zehnder modulator 640. In a preferred embodiment, portion 600 is repeated to form an array. Therefore, optical paths 606A, 606'A, 606C and 606'C, as well as antenna elements 608A and 608D and coupling strips 614A and 614C are shown for clarity. These elements form portions of other Mach-Zehnder modulators, as would be apparent to one skilled in the relevant art. Coupling strips 614A and 614C form portions of other Mach-Zehnder modulators.

In operation, the potential induced by electromagnetic energy 414 upon an antenna element 608 with respect to a coupling strip 614 modulates the optical signal on an intervening optical path 606. In particular, the phase of the optical signal changes in accordance with the magnitude of the potential. Referring to Mach-Zehnder modulator 640, when a differential potential exists between antenna element 608B and coupling strip 614B, and when antenna element 608C and metallic strip 614B are tied electrically together, such they are at the same potential, the optical signal traversing optical path 606B is modulated to have a different phase than optical path 606'B. When these optical signals are again joined, an interference pattern results and thus the optical signal becomes amplitude modulated. This amplitude modulated optical signal exits Mach-Zehnder modulator 640 along an output fiber 412.

Figure 7:
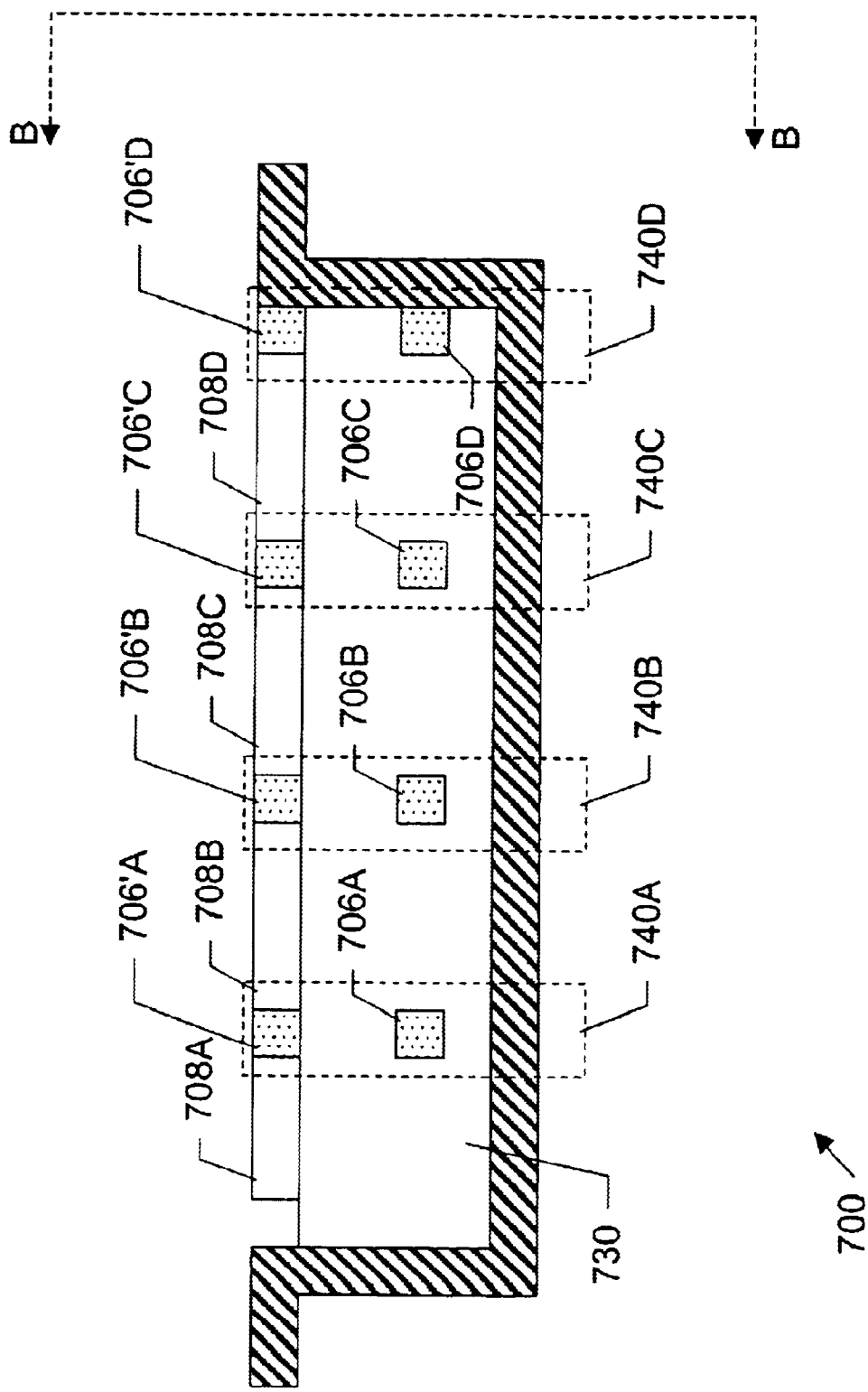
FIG. 7 depicts a portion of a sampler array according to another embodiment of the present invention.

FIG. 7 depicts a portion 700 of a sampler array according to another embodiment of the present invention. In this configuration, Mach-Zehnder modulators 740 have been rotated 90 degrees relative to the surface of the array, as compared to the array of FIG. 4. Portion 700 includes four Mach-Zehnder modulators 740A, B, C, D. Mach-Zehnder modulator 740A is exemplary. Mach-Zehnder modulator 740A includes antenna elements 708A and 708B, optical path 706A, and optical path 706'A. Optical path 706'A is embedded within a material 730. In a preferred embodiment, material 730 is the same polymer material used to form the optical waveguides, and loaded with a chromophore to make it electro-optic. Antenna element 708 is formed by depositing metallic strips onto material 730.

A chromophore is a class of materials that exhibits an "electro-optic" effect. It is through this electro-optic effect that we can manipulate the light that passes the material, as is well known in the relevant arts. For example, an electrical voltage, when applied to an electro-optic material, will alter its optical characteristics, such as its index of refraction. In a preferred embodiment, a chromophore material is embedded in a portion of a polymer layer to create the "core" of an electro-optic waveguide.

Figure 8:
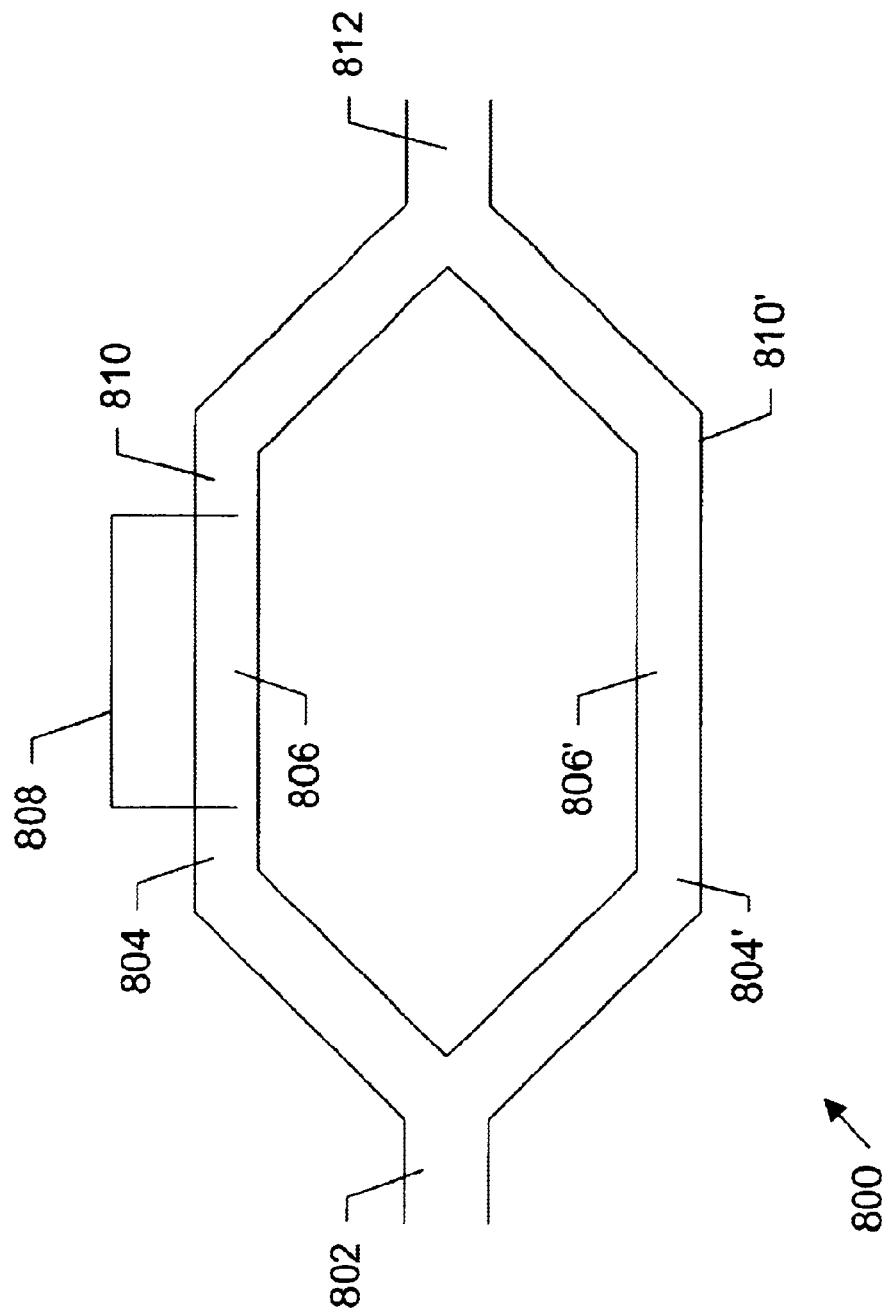
FIG. 8 depicts a cross-section of a portion of the sampler array of FIG. 7.

FIG. 8 depicts a cross-section of a portion 800 of the sampler array of FIG. 7 corresponding to section B—B in FIG. 7. An optical signal enters input optical path 802, and is split into two portions. One portion traverses the "modulated" arm defined by optical paths 804, 806, and 810. The other portion traverses the "unmodulated" arm defined by optical paths 804', 806', and 810'. The optical signal in the modulated arm passes between a pair of antenna elements 808, and so is modulated by the differential potential induced upon the antenna elements by an impinging wavefront. The optical signal traversing the unmodulated arm experiences no differential electrical potential, and so is not modulated. When the modulated and unmodulated signals are joined in output optical path 812, an interference pattern results, producing amplitude modulation of the optical carrier. The resulting signal can be processed as described above.

Figure 9:
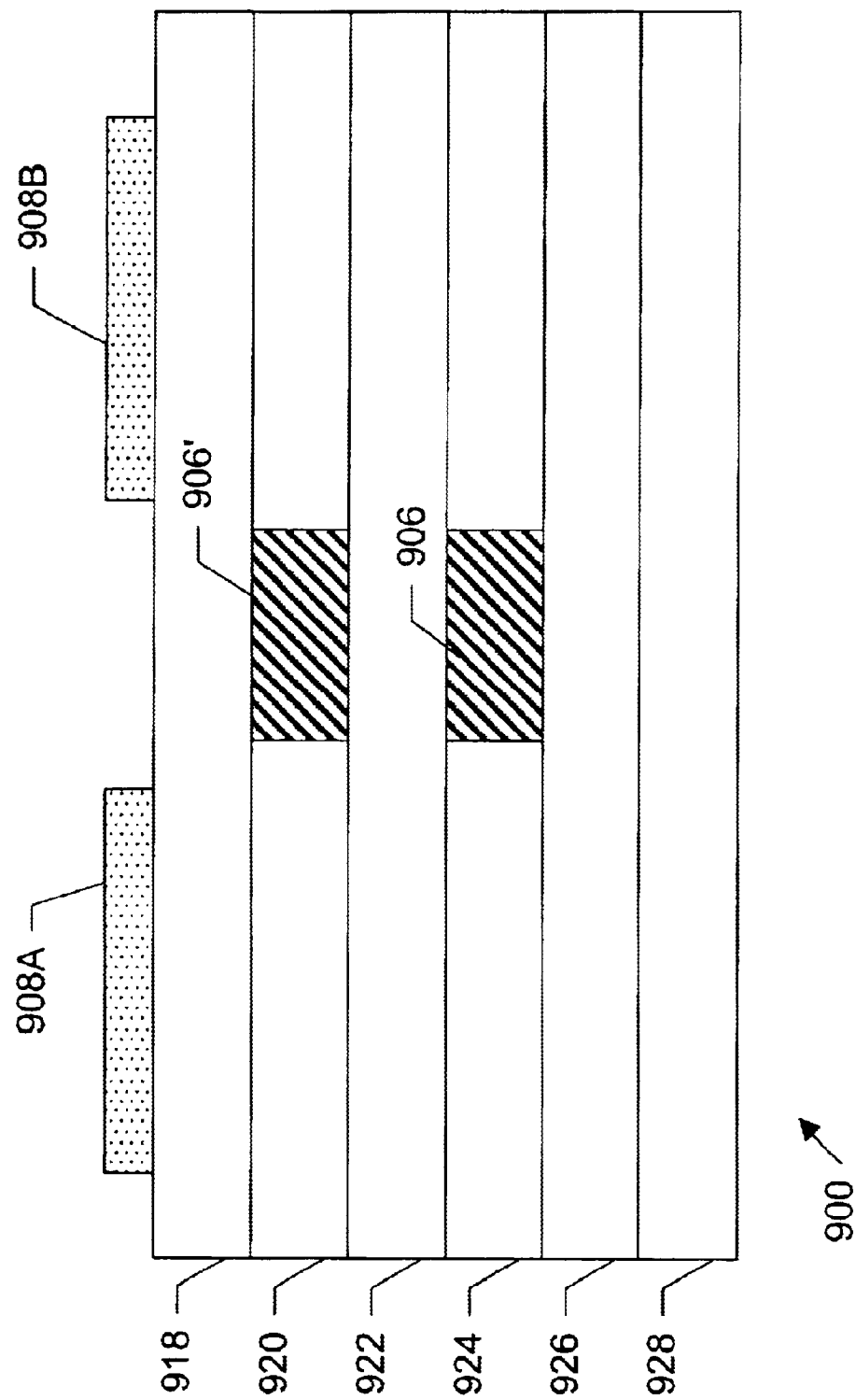
FIG. 9 depicts a portion of a sampler array according to an embodiment of the present invention.

FIG. 9 depicts a portion 900 of a sampler array according to an embodiment of the present invention. In this configuration, as in the configuration of FIG. 7, a Mach-Zehnder modulator has been rotated 90 degrees relative to the surface of the array, as compared to the array of FIG. 4. In this embodiment, there are at least six layers. Starting from the bottom, portion 900 includes a silicon layer 928 that serves as a base onto which the other layers are deposited, a polymer dielectric layer 926, a polymer dielectric layer 924 that is photobleached, and into which an optical waveguide 906 is formed, a polymer layer 922, a polymer layer 920 that is photobleached, and into which an optical waveguide 906' is formed, a final polymer layer 918, which forms the final waveguide and onto which metallic strips 908A, B are deposited. Other embodiments of the invention are constructed in a similar fashion.

Photobleaching is a method used to change a material's properties through the use of light. Predetermined areas of the material are exposed to light at various wavelengths and strengths to change that material properties, for example, to permanently change the index of refraction. In a preferred embodiment, a "mask" is placed over the material to allow selective photobleaching of predetermined areas of the material. In general, the section of a polymer layer that is to become the "cladding" of a waveguide is photobleached to have a lower index of refraction (for example, n~1.60) than the core (for example, n~1.62). This condition allows light to travel down the waveguide (through the core) without radiating out through the cladding material, as is well known in the relevant arts.

Figure 10:
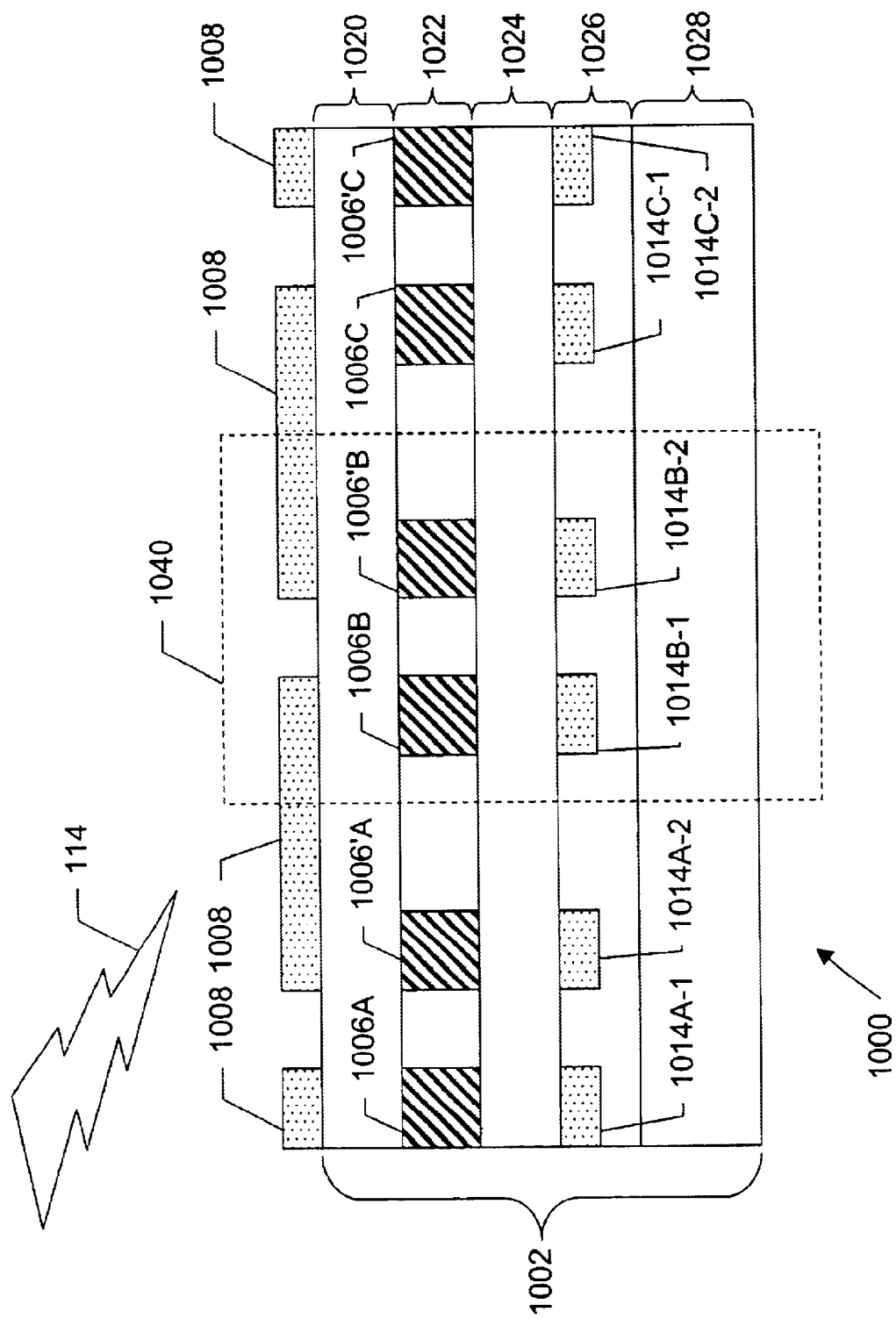
FIG. 10 presents a cross-section of a portion of a sampler array according to another embodiment of the present invention.

FIG. 10 presents a cross-section of a portion 1000 of one embodiment of sampler array 400, which corresponds to section A—A of FIG. 5. Portion 1000 is similar to portion 600, shown in FIG. 6. Thus, portion 1000 includes antenna elements 1008A, B, C, D, which are mounted upon body 1002. Body 1002 includes polymer layers 1020, 1022, and 1024. Layer 1022 includes a plurality of optical paths. In particular, the optical paths include paths 1006B and 1006'B, which form the branches of a single Mach-Zehnder modulator 1040. Layer 1026 includes a plurality of coupling strips 1014.

In contrast to portion 600, in the embodiment shown in FIG. 10, each coupling strip, such as coupling strip 1014B, is divided into two portions, such as coupling strip portions 1014B-1 and 1014B-2. As shown, the first optical path 1006B is disposed between antenna element 1008B and the portion 1014B-1 of coupling strip 1014B, while the second optical path 1006'B is disposed between antenna element 1008C and the portion 1014B-2 of coupling strip 1014B. Coupling strip 1014B forms a part of Mach-Zehnder modulator 1040. In a preferred embodiment, portion 1000 is repeated to form an array. Therefore, optical paths 1006A, 1006'A, 1006C and 1006'C, as well as antenna elements 1008A and 1008D and coupling strips 1014A and 1014C are shown for clarity. These elements form portions of other Mach-Zehnder modulators, as would be apparent to one skilled in the relevant art. Coupling strips 1014A and 1014C form portions of other Mach-Zehnder modulators.

Figure 12:
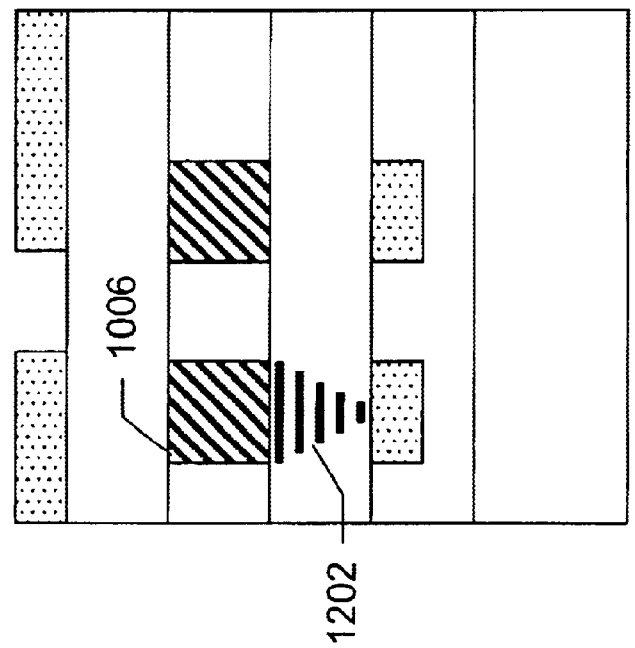
FIG. 12 is a simplified depiction of the operation of the sampler array shown in FIG. 10.
Figure 11:
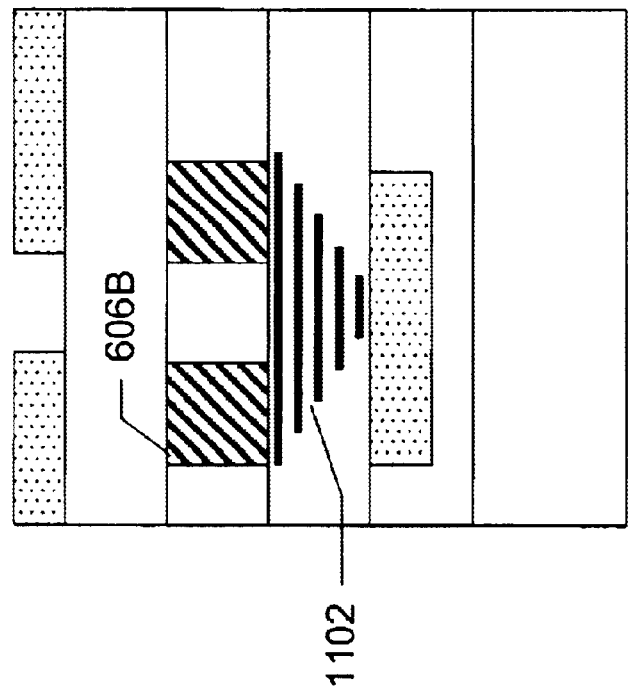
FIG. 11 is a simplified depiction of the operation of the sampler array shown in FIG. 6.

In operation, the potential induced by electromagnetic energy 414 upon an antenna element 1008 with respect to a coupling strip 1014 modulates the optical signal on an intervening optical path 1006. In particular, the phase of the optical signal changes in accordance with the magnitude of the potential. Referring to Mach-Zehnder modulator 1040, when a differential potential exists between antenna element 1008B and coupling strip 1014B, and when antenna element 1008C and metallic strip 1014B are tied electrically together, such they are at the same potential, the optical signal traversing optical path 1006B is modulated to have a different phase than optical path 1006'B. When these optical signals are again joined, an interference pattern results and thus the optical signal becomes amplitude modulated. This amplitude modulated optical signal exits Mach-Zehnder modulator 1040 along an output fiber 412. The embodiment shown in FIG. 10 increases the interaction voltage across the electro-optically active path by changing the primary direction of the voltage fields. An example of the voltage fields generated in the embodiment of FIG. 6 is shown in FIG. 11. The voltage field 902, which interacts with optical path 606B is spread over a wide area and is thus significantly diffused. By contrast, the voltage field 1002 of the embodiment shown in FIG. 10, as shown in FIG. 12, is concentrated in the optical path 1006B.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An apparatus for imaging radio frequency electromagnetic signals comprising:
   an optical source operable to output an unmodulated optical signal;
   an image sensor operable to receive the unmodulated optical signal and an incident radio frequency electromagnetic signal and to modulate the unmodulated optical signal with the received radio electromagnetic signal so as to form a modulated optical signal;
   a lens operable to receive the modulated optical signal and to focus the modulated optional signal; and
   a photodetector operable to receive the focused modulated optical signal and output and electrical signal representing the focused modulated optical signal.

2. The apparatus of claim 1, wherein the optical source is a laser.

3. The apparatus of claim 1, wherein the image sensor comprises:
   a plurality of cells, each cell comprising:
      a first electro-optically active optical waveguide;
      a first planar electrode substantially parallel to the first waveguide;
      a second electro-otically active optical waveguide;
      a second planar electrode substantially parallel to the second waveguide, the first and second planar electrodes being substantially adjacent and coplanar; and
      a third planar electrode substantially parallel to the first and second planar electrodes and disposed such that the first waveguide lies between the first and third planar electrodes, and the second waveguide lies between the second and third planar electrodes.

4. The apparatus of claim 3, wherein the optical source is coupled to a first end of each of the waveguides.

5. The apparatus of claim 4, further comprising:
   an output optical waveguide coupled to the second end of each of the first and second waveguides.

6. The apparatus of claim 5, further comprising:
   a coupler electrically connecting the first and third planar electrodes, whereby the first and third planar electrodes are kept at substantially the same electrical potential.

7. The apparatus of claim 6, further comprising:
   a polymer layer in which the waveguides are formed and to which the planar electrodes are attached.

8. The apparatus of claim 7, wherein the first planar electrode is arranged so that an incident radio frequency electromagnetic signal will impinge upon the first planar electrode.

9. The apparatus of claim 3, wherein the third planar electrode comprises a first portion and a second portion and is disposed such that the first waveguide lies between the first planar electrode and the first portion of the third planar electrode, and the second waveguide lies between the second planar electrode and the second portion of the third planar electrode.

10. The apparatus of claim 9, wherein the optical source is coupled to a first end of each of the waveguides.

11. The apparatus of claim 10, further comprising:
    an output optical waveguide coupled to the second end of each of the first and second waveguides.

12. The apparatus of claim 11, further comprising:
    a coupler electrically connecting the first planar electrode and the first and second portions of the third planar electrode, whereby the first planar electrode and the first and second portions of the third planar electrode are kept at substantially the same electrical potential.

13. The apparatus of claim 12, further comprising:
    a polymer layer in which the waveguides are formed and to which the planar electrodes are attached.

14. The apparatus of claim 13, wherein the first planar electrode is arranged so that an incident radio frequency electromagnetic signal will impinge upon the first planar electrode.

15. The apparatus of claim 1, wherein the photodetector is an array of photodiodes.

16. An apparatus for imaging radio frequency electromagnetic signals comprising:
    an imaging sensor operable to receive an incident radio frequency signal and output a corresponding electrical signal; and a processor operable to receive the electrical signal and generate a signal representing an image of the received radio frequency signal;

wherein the imaging sensor comprises:
an optical source operable to output an unmodulated optical signal;
an image sensor operable to receive the unmodulated optical signal and an incident radio frequency electromagnetic signal and to modulate the unmodulated optical signal with the received radio frequency electromagnetic signal so as to form a modulate optical signal;
a lens operable to receive the modulated optical signal and to focus the modulated optical signal; and
a photodector operable to receive the focused modulated optical signal and output an electrical signal representing the focused modulated optical signal.

17. The apparatus of claim 16, wherein the optical source is a laser.

18. The apparatus of claim 16, wherein the image sensor comprises:
a plurality of cells, each cell comprising:
first electro-optically active optical waveguide;
a first planar electrode substantially parallel to the first waveguide;
a second electro-optically active optical waveguide;
a second planar electrode substantially parallel to the second waveguide, the first and second planar electrodes being substantially adjacent and coplanar, and
a third planar electrode substantially parallel to the first and second planar electrodes and disposed such that the first waveguide lies between the first and third planar electrodes, and the second waveguide lies between the second and third planar electrodes.

19. The apparatus of claim 18, wherein the optical source is coupled to a first end of each of the waveguides.

20. The apparatus of claim 19, further comprising:
an output optical waveguide coupled to a second end of each of the first and second waveguides.

21. The apparatus of claim 20, further comprising:
a coupler electrically connecting the first and third planar electrodes, whereby the first and third planar electrodes are kept at substantially the same electrical potential.

22. The apparatus of claim 21, further comprising:
a polymer layer in which the waveguides are formed and to which the planar electrodes are attached.

23. The apparatus of claim 22, wherein the second planar electrode is arranged so that the incident radio frequency electromagnetic signal will impinge upon the second planar electrode.

24. The apparatus of claim 18, wherein the third planar electrode comprises a first portion and a second portion and is disposed such that the first waveguide lies between the first planar electrode and the first portion of the third planar electrode, and the second waveguide lies between the second planar electrode and the second portion of the third planar electrode.

25. The apparatus of claim 24, wherein the optical source is coupled to a first end of each of the waveguides.

26. The apparatus of claim 25, further comprising:
an output optical waveguide coupled to a second end of each of the first and second waveguide.

27. The apparatus of claim 26, further comprising:
a coupler electrically connecting the first planar electrode and the first and second portions of the third planar electrode, whereby the first planar electrode and the first and second portions of the third planar electrode are kept at substantially the same electrical potential.

28. The apparatus of claim 27, further comprising:
a polymer layer in which the waveguides are formed and to which the planar electrodes are attached.

29. The apparatus of claim 28, wherein the second planar electrode is arranged so that the incident radio frequency electromagnetic signal will impinge upon the second planar electrode.

30. The apparatus of claim 16, wherein the photodetector is an array of photodiodes.

31. The system for imaging a target using imaging radio electromagnetic signals comprising:
an illuminator operable to radiate radio frequency electromagnetic signals so as to illuminate the target; and
an imaging apparatus operable to receive radio frequency electromagnetic signals reflected from the target and to image the received radio frequency electromagnetic signals wherein the imaging apparatus comprising
an imaging sensor operable to receive an incident radio frequency signal and output a corresponding electrical signal;
a processor operable to receive the electrical signal and generate a signal representing an image of the received radio frequency signal; and
a display operable to display a signal representing the image of the received radio frequency signal;

wherein the imaging sensor comprise:
an optical source operable to output an unmodulated optical signal;
an image sensor operable to receive the unmodulated optical signal and an incident radio frequency electromagnetic signal and to modulate the unmodulated optical signal with the received radio frequency electromagnetic signal so as to form a modulated optical signal,
a lens operable to receive the modulated optical signal and to focus the modulated optical signal; and
a photodetector operable to receive the focused modulated optical signal and output an electrical signal representing the focused modulated optical signal.

32. The apparatus of claim 31, wherein the optical source is a laser.

33. The apparatus of claim 32, wherein the image sensor comprises:
a plurality of cells, each cell comprising:
a first electro-optically active optical waveguide;
a first planar electrode substantially parallel to the first waveguide;
a second electro-optically active optical waveguide;
a second planar electrode substantially parallel to the second waveguide, the first and second planar electrodes being substantially adjacent an coplanar; and
a third planar electrode substantially parallel to the first and second planar electrodes an disposed such that the first waveguide lies between the first and third planar electrodes, and the second waveguide lies between the second and third planar electrodes.

34. The apparatus of claim 33, wherein the optical source is coupled to a first end of each of the waveguides.

35. The apparatus of claim 34, further comprising:
an output optical waveguide to a second end of each of the first and second waveguides.

36. The apparatus of claim 35, further comprising:

a coupler electrically connecting the first and third planar electrodes, whereby the first and third planar electrodes are kept at substantially the same electrical potential.

37. The apparatus of claim 36, further comprising:

a polymer layer in which the waveguides are formed and to which the planar electrodes are attached.

38. The apparatus of claim 37 wherein the second planar electrode is arranged so that the incident radio frequency electromagnetic signal will impinge upon the second planar electrode.

39. The apparatus of claim 33, wherein the third planar electrode comprises a first portion and a second portion and is disposed such that the first waveguide lies between the first planar electrode and the first portion of the third planar electrode, and the second waveguide lies between the second planar electrode and the second portion of the third planar electrode.

40. The apparatus of claim 39, wherein the optical source is coupled to a first end of each of the waveguides.

41. The apparatus of claim 40, further comprising:

and output optical waveguide coupled to a second end of each of the first and second waveguides.

42. The apparatus of claim 41, further comprising:

a coupler electrically connecting the first planar electrode and the first and second portions of the third planar electrode, whereby the first planar electrode and the first and second portions of the third planar electrode are kept at substantially the same electrical potential.

43. The apparatus of claim 42, further comprising:

a polymer layer in which the waveguides are formed and to which the planar electrodes are attached.

44. The apparatus of claim 43, wherein the second planar electrode is arranged so that the incident radio frequency electromagnetic signal will impinge upon the second planar electrode.

* * * * *

UNITED STATES PATENT AND TRADEMARK OFFICE
CERTIFICATE OF CORRECTION

PATENT NO. : 6,703,596 B1
DATED : March 9, 2004
INVENTOR(S) : Joseph E. Moran

It is certified that error appears in the above-identified patent and that said Letters Patent is hereby corrected as shown below:

Column 11,
Line 64, "radio electromagnetic" should read -- radio frequency electromagnetic --.

Column 12,
Line 2, "output and electrical" should read -- output an electrical --.
Line 12, "electro-otically" should read -- electro-optically --.

Column 13,
Line 23, "first electro-optically" should read -- a first electro-optically --.
Line 63, "waveguide." should read -- waveguides. --.

Column 14,
Line 13, "The system" should read -- A system --.
Line 21, "comprising" should read -- comprises: --.
Line 59, "electrodes an disposed" should read -- electrodes and disposed --.

Column 16,
Line 2, "and output" should read -- an output --.

Signed and Sealed this

Eighth Day of February, 2005

JON W. DUDAS
*Director of the United States Patent and Trademark Office*